(12) United States Patent
Otsuka et al.

(10) Patent No.: US 11,106,042 B2
(45) Date of Patent: Aug. 31, 2021

(54) IMAGE PROCESSING APPARATUS, HEAD-MOUNTED DISPLAY, AND IMAGE DISPLAYING METHOD

(71) Applicant: Sony Interactive Entertainment Inc., Tokyo (JP)

(72) Inventors: Katsushi Otsuka, Tokyo (JP); Takashi Shimazu, Tokyo (JP); Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/825,057

(22) Filed: Mar. 20, 2020

(65) Prior Publication Data
US 2020/0310128 A1 Oct. 1, 2020

(30) Foreign Application Priority Data

Mar. 29, 2019 (JP) .............................. JP2019-068188
Oct. 8, 2019 (JP) .............................. JP2019-185340

(51) Int. Cl.
*G02B 27/01* (2006.01)
*G06T 19/00* (2011.01)

(52) U.S. Cl.
CPC ........ *G02B 27/0172* (2013.01); *G06T 19/006* (2013.01); *G02B 2027/011* (2013.01); *G02B 2027/014* (2013.01); *G02B 2027/0116* (2013.01); *G02B 2027/0138* (2013.01); *G02B 2027/0147* (2013.01)

(58) Field of Classification Search
CPC .......... G02B 27/0172; G02B 2027/011; G02B 2027/0116; G02B 2027/0138; G02B 2027/014; G02B 2027/0147; G02B 2027/116; G06T 19/006; G06T 5/006
See application file for complete search history.

(56) References Cited

U.S. PATENT DOCUMENTS

| | | | |
|---|---|---|---|
| 2007/0268316 A1* | 11/2007 | Kajita | G02B 27/017 345/642 |
| 2010/0090929 A1* | 4/2010 | Tsujimoto | G06T 5/006 345/7 |
| 2017/0323419 A1* | 11/2017 | Holland | G06T 1/60 |
| 2019/0051052 A1* | 2/2019 | Corazza | G06T 15/506 |

* cited by examiner

*Primary Examiner* — Xuemei Zheng
(74) *Attorney, Agent, or Firm* — Katten Muchin Rosenman LLP

(57) ABSTRACT

Disclosed herein is an image processing apparatus including: a signal processing unit configured to acquire data of a captured image; a correction unit configured to correct the captured image to an image suitable for display; a synthesis unit configured to synthesize an image for synthesis transmitted from an apparatus, which is not provided integrally with the image processing apparatus, with the captured image; and an image display controlling unit configured to control a display panel to display the synthesized image. The correction unit carries out, from among processes for correcting the captured image to the image suitable for display, part of the correction processes for the captured image before the synthesis by the synthesis unit and carries out remaining correction processes for the image after the synthesis.

16 Claims, 11 Drawing Sheets

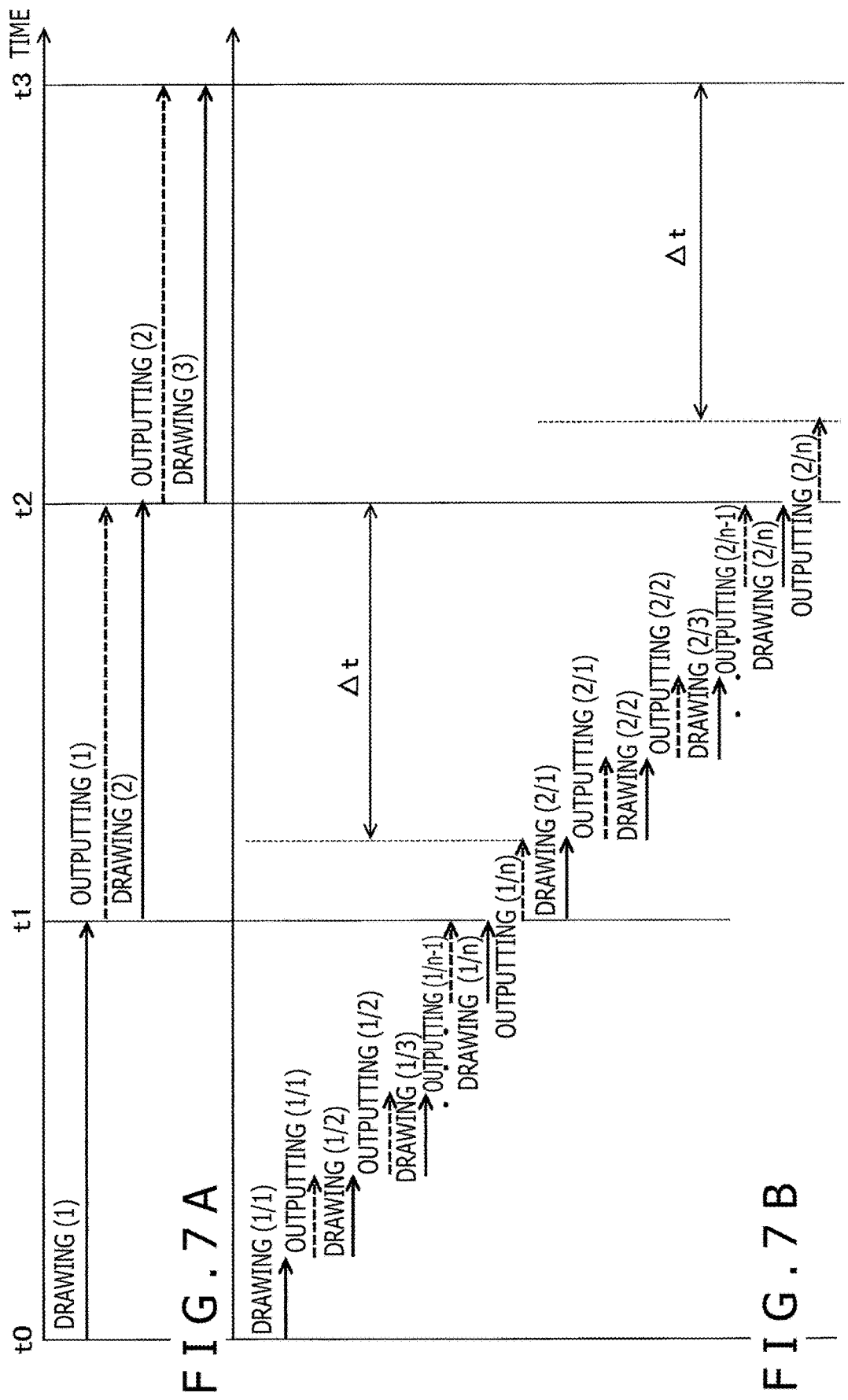

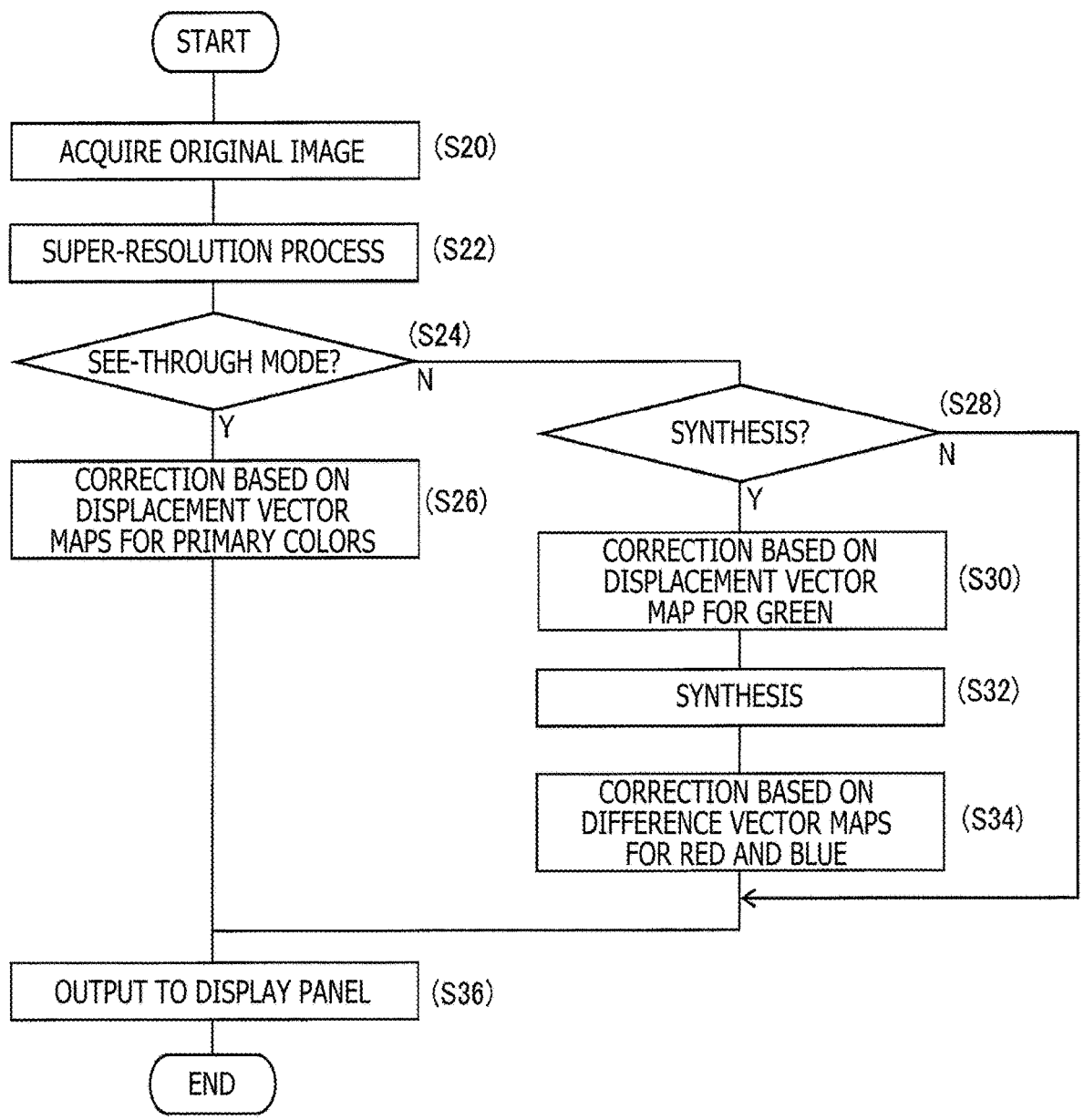

IMAGE PROCESSING APPARATUS, HEAD-MOUNTED DISPLAY, AND IMAGE DISPLAYING METHOD

CROSS REFERENCE TO RELATED APPLICATIONS

This application claims the benefit of Japanese Priority Patent Application JP 2019-068188 filed Mar. 29, 2019 and Japanese Priority Patent Application JP 2019-185340 filed Oct. 8, 2019, the entire contents of each of which are incorporated herein by reference.

BACKGROUND

The present disclosure relates to a head-mounted display that displays an image in front of a user who wears the head-mounted display, an image processing apparatus that processes a display image, and an image displaying method performed by the image processing apparatus.

An image processing system that allows a user to appreciate a target space from a free visual point has become popular. For example, a system has been developed in which a panorama video is displayed on a head-mounted display and an image according to a gaze direction of the user who wears the head-mounted display is displayed. If a head-mounted display is utilized, then it is possible to increase immersion in the video or improve operability of an application of a game, for example. Also, a walk-through system has been developed which allows, when a user who wears a head-mounted display physically moves, the user to virtually walk around in a space displayed as a video.

Types of a head-mounted display include a shielded type in which light from the outside world is blocked such that the field of vision of the user is covered and an optical transmission type in which light from the outside world is taken in such that a situation of surroundings can be viewed. In a case where augmented reality (AR) or mixed reality (MR) that merges an actual space and a virtual object (virtual space) with each other is implemented by a head-mounted display, the optical transmission type is superior in terms of easy overlay display, delay time before display, low system load (power consumption) for drawing and so forth. On the other hand, since a head-mounted display of the shielded type can fully block an external vision, immersive virtual reality can be implemented.

SUMMARY

In a head-mounted display of the shielded type, basically light emission of a display panel is the only visual stimulus. Accordingly, if a period during which no image is displayed exists, for example, during a period after the user wears the head-mounted display until an image of content is displayed or after display comes to an end, then the appreciator is naturally placed into a state in which the appreciator sees nothing. As a result, during such a period as just described, there is a risk that the appreciator may stumble over or hit something therearound. Further, if the user wants to see a surrounding situation and pick up a controller placed nearby in a state in which an image of a virtual world is displayed, then it may be necessary for the user to remove the head-mounted display every time.

In the case where it is intended to implement AR or MR on a head-mounted display of the shielded type, it is conceivable to provide a camera on a front face of the head-mounted display and synthesize an image generated separately in regard to a virtual object with a captured image of the camera. However, since various additional processes are performed, the power consumption increases, and the camera and an apparatus generating content of a virtual object or the like are not sometimes provided integrally. As a result, some delay is likely to occur after imaging before displaying and the user is liable to feel uncomfortable.

The present disclosure has been made in view of such a subject as described above, and it is desirable to provide a technology that can appropriately achieve both visibility without discomfort of a surrounding situation for a user in a state in which the user wears a head-mounted display of the shielded type and appreciation of content in which a virtual object or the like is synthesized.

According to an embodiment of the present disclosure, there is provided an image processing apparatus including: a signal processing unit configured to acquire data of a captured image; a correction unit configured to correct the captured image to an image suitable for display; a synthesis unit configured to synthesize an image for synthesis transmitted from an apparatus, which is not provided integrally with the image processing apparatus, with the captured image; and an image display controlling unit configured to control a display panel to display the synthesized image. The correction unit carries out, from among processes for correcting the captured image to the image suitable for display, part of the correction processes for the captured image before the synthesis by the synthesis unit and carries out remaining correction processes for the image after the synthesis.

According to another embodiment of the present disclosure, there is provided a head-mounted display including an image processing apparatus, an imaging apparatus, and a display panel. The image processing apparatus includes a signal processing unit configured to acquire data of a captured image, a correction unit configured to correct the captured image to an image suitable for display, a synthesis unit configured to synthesize an image for synthesis transmitted from an apparatus, which is not provided integrally with the image processing apparatus, with the captured image, and an image display controlling unit configured to control the display panel to display the synthesized image. The correction unit carries out, from among processes for correcting the captured image to the image suitable for display, part of the correction processes for the captured image before the synthesis by the synthesis unit and carrying out remaining correction processes for the image after the synthesis. The imaging apparatus supplies a captured image to the signal processing unit.

According to a further embodiment of the present disclosure, there is provided an image displaying method by an image processing apparatus, the image displaying method including: acquiring data of a captured image; carrying out part of correction processes for correcting the captured image to an image suitable for display; synthesizing an image for synthesis transmitted from an apparatus, which is not provided integrally with the image processing apparatus, with the captured image for which the part of the correction processes has been carried out; carrying out, for the image after the synthesis, remaining correction processes from among the correction processes for correcting the captured image to an image suitable for display to generate a display image; and causing a display panel to display the display image.

It is to be noted that also an arbitrary combination of the constituent elements described above and conversions of representations of the embodiments of the present disclosure between a method, an apparatus, a system, a computer program, a data structure, a recording medium, and so forth are effective as modes of the present disclosure.

According to the embodiments of the present disclosure, the head-mounted display of the shielded type can achieve both viewing of a surrounding situation free from discomfort and appreciation of content in which a virtual object and so forth are synthesized with small delay and low power consumption.

The above and other objects, features and advantages of the present disclosure will become apparent from the following description and the appended claims, taken in conjunction with the accompanying drawings in which like parts or elements are denoted by like reference symbols.

BRIEF DESCRIPTION OF THE DRAWINGS

FIGS. 7A and 7B are views illustrating significance of the present embodiment in regard to a period of time taken after an image free from distortion is generated by processing until it is displayed;

FIG. 13 is a flowchart depicting a processing procedure when the head-mounted display of the present embodiment displays a captured image or the like.

DETAILED DESCRIPTION OF THE PREFERRED EMBODIMENT

Figure 1:
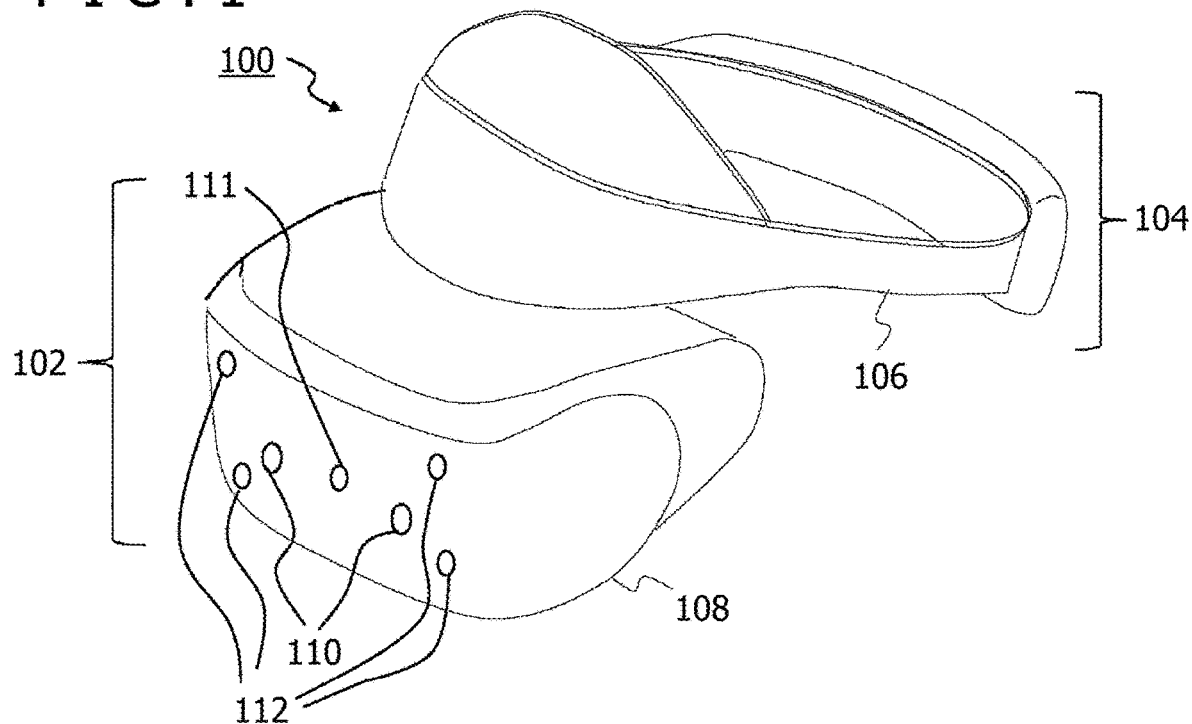
FIG. 1 is a view depicting an example of an appearance of a head-mounted display of an embodiment of the present disclosure.

FIG. 1 depicts an example of an appearance of a head-mounted display 100. In the present example, the head-mounted display 100 includes an outputting mechanism unit 102 and a mounting mechanism unit 104. The mounting mechanism unit 104 includes a mounting band 106 that goes, when the mounting mechanism unit 104 is worn by a user, around the head of the user to implement fixation of the head-mounted display 100. The outputting mechanism unit 102 includes a housing 108 shaped such that it covers the left and right eyes of the user in a state in which the user wears the head-mounted display 100, and includes, in the inside of the housing 108, a display panel that faces the eyes of the user when the head-mounted display 100 is worn by the user.

The housing 108 further includes, in the inside thereof, eyepieces that are positioned between the display panel and the eyes of the user when the head-mounted display 100 is worn and enlarges an image to be viewed by the user. The head-mounted display 100 may further include speakers or earphones at positions corresponding to the ears of the user when the head-mounted display 100 is worn. Further, the head-mounted display 100 may have built-in motion sensors such that a translational motion or a rotational motion and eventually a position or a posture at each time of the head of the user wearing the head-mounted display 100 are detected.

The head-mounted display 100 further includes a stereo camera 110 on a front face of the housing 108, a monocular camera 111 of a wide viewing angle at a middle portion of the front face, and four cameras 112 of a wide viewing angle at the four left upper, right upper, left lower, and right lower corners of the front face. The head-mounted display 100 captures a moving picture of an actual space in a direction corresponding to an orientation of the face of the user. In the present embodiment, a mode is provided by which an image captured by the stereo camera 110 is displayed immediately such that a manner of the actual space in a direction in which the user is directed is displayed as it is. Such a mode as just described is hereinafter referred to as "see-through mode." During a period during which an image of content is not displayed, the head-mounted display 100 basically takes the see-through mode.

The head-mounted display 100 automatically transits to and takes the see-through mode, and therefore, before starting, after ending, or upon interruption of content or in a like case, the user can confirm a surrounding situation without removing the head-mounted display 100. The transition timing to the see-through mode may otherwise be a timing when the user explicitly performs a transition operation or the like. This makes it possible for the user to perform desired operation such as temporary switching, even during appreciation of content, of the display to that of an image of the actual space at an arbitrary timing and finding and picking up a controller.

At least one of captured images by the stereo camera 110, the monocular camera 111, and the four cameras 112 can be utilized also as an image of content. For example, if a virtual object is synthesized with the captured image in such a position, a posture, and a motion as those corresponding to the reflected actual space and displayed, then AR or MR can be implemented. In this manner, a position, a posture, and a motion of an object to be drawn can be determined using a result of analysis of a captured image irrespective of whether or not the captured image is to be included in the display.

For example, stereo matching may be performed for the captured image to extract corresponding points such that a distance to an imaging target is acquired in accordance with the principle of triangulation. As an alternative, the position or the posture of the head-mounted display 100 and eventually of the head of the user with respect to a surrounding space may be acquired by simultaneous localization and mapping (SLAM). Also, object recognition, object depth measurement, and so forth can be performed. By these processes, a virtual world can be drawn and displayed in a field of vision corresponding to the position of the visual point or the gaze direction of the user.

It is to be noted that the actual shape of the head-mounted display 100 of the present embodiment is not limited to that depicted in FIG. 1 if it is a head-mounted display of the shielded type that blocks the view of the user and includes cameras that capture an actual space in a field of vision corresponding to the position or the direction of the face of the user. Further, if an image of the field of vision of the left eye and an image of the field of vision of the right eye are artificially generated in the see-through mode, then also it is possible to use a monocular camera or the four cameras 112 in place of the stereo camera 110.

Figure 2:
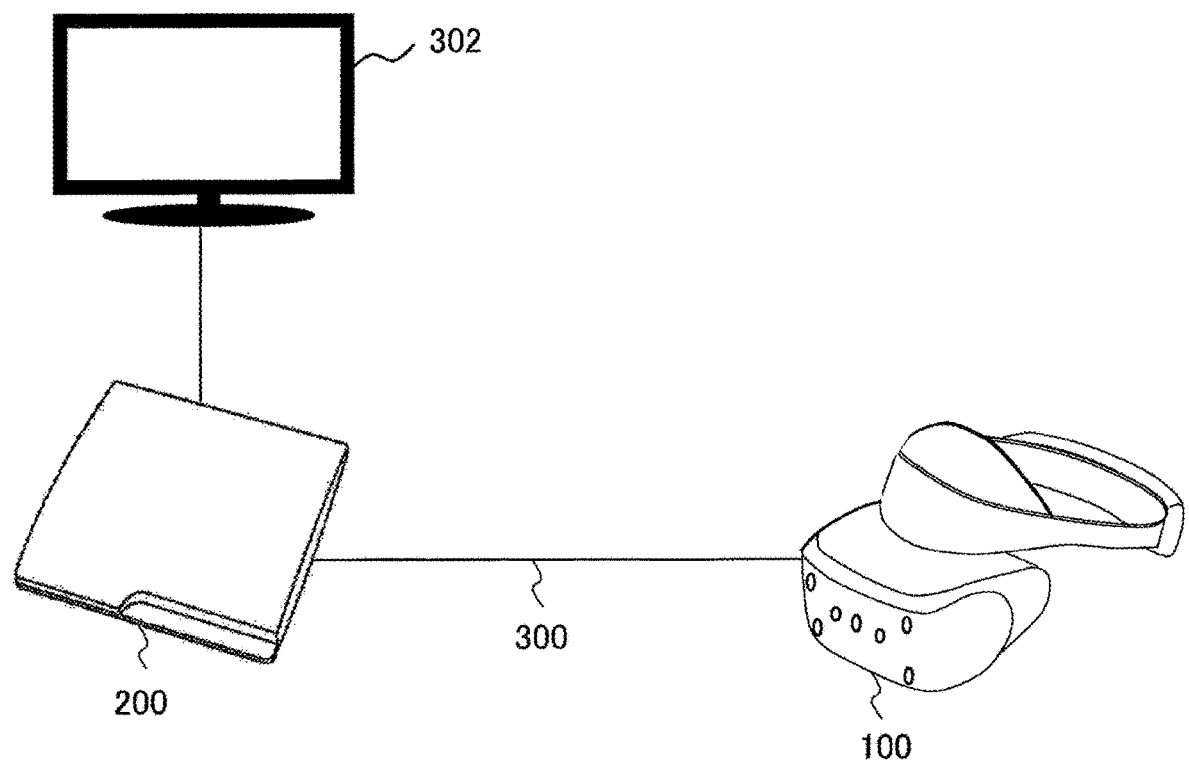
FIG. 2 is a view depicting an example of a configuration of a content processing system of the present embodiment.

FIG. 2 depicts an example of a configuration of a content processing system according to the present embodiment. The head-mounted display 100 is connected to a content processing apparatus 200 by an interface 300 for wireless communication or for connecting a peripheral apparatus such as universal serial bus (USB) Type-C. A flat panel display 302 is connected to the content processing apparatus 200. The content processing apparatus 200 may be further connected to a server through a network. In this case, the server may provide the content processing apparatus 200 with an online application such as a game in which a plurality of users can participate through the network.

Basically, the content processing apparatus 200 processes a program of content and generates a display image and transmits it to the head-mounted display 100 or the flat panel display 302. In a certain mode, the content processing apparatus 200 specifies a position of a visual point or a direction of gaze of a user who wears the head-mounted display 100 on the basis of the position and the posture of the head of the user and generates a display image of a corresponding field of vision at a predetermined rate.

The head-mounted display 100 receives data of the display image and displays the data as an image of the content. Here, a purpose of displaying an image is not restricted specifically. For example, the content processing apparatus 200 may generate a virtual world, which is a stage of a game, as a display image while an electronic game is being progressed or may display a still image or a moving image for the purpose of appreciation or information provision irrespective of whether the image indicates a virtual world or an actual world.

It is to be noted that a distance between the content processing apparatus 200 and the head-mounted display 100 or a communication method of the interface 300 is not restricted specifically. The content processing apparatus 200 may be a game device owned by an individual, a server of an enterprise that provides various delivery services of a cloud game or the like, or an in-home server that transmits data to an arbitrary terminal. Accordingly, the communication between the content processing apparatus 200 and the head-mounted display 100 may be implemented not only by such technique of the examples described above but also through an arbitrary network or an arbitrary access point such as a public network like the Internet, a local area network (LAN), a mobile phone carrier network, a Wi-Fi spot in a town, or a Wi-Fi access point at home.

Figure 3:
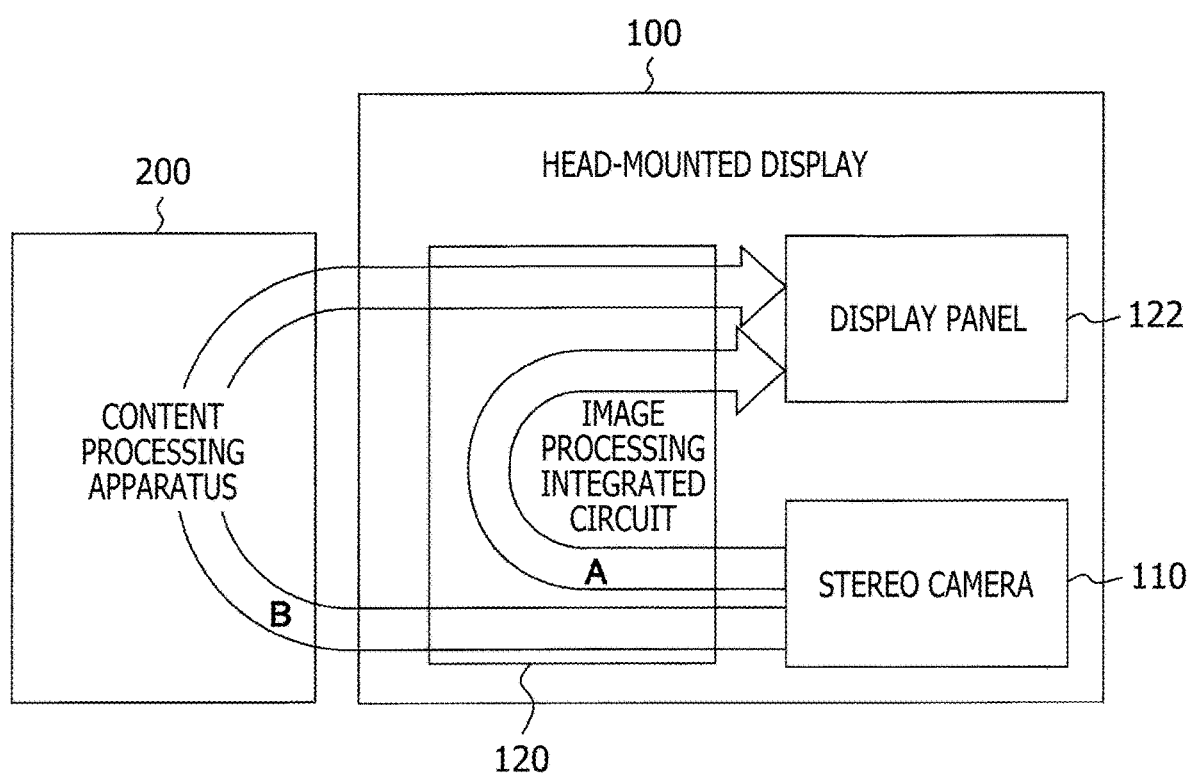
FIG. 3 is a view schematically depicting a path of data in the content processing system.

FIG. 3 schematically depicts a path of data in the content processing system of the present embodiment. The head-mounted display 100 includes the stereo camera 110 and a display panel 122 as described hereinabove. However, the camera is not limited to the stereo camera 110 but may be any one or a combination of the monocular camera 111 and the four cameras 112. This similarly applies also to the following description. The display panel 122 is a panel having a general displaying mechanism such as a liquid crystal display or an organic electroluminescence (EL) display and displays an image in front of the eyes of the user who wears the head-mounted display 100. Further, the head-mounted display 100 includes an image processing integrated circuit 120 in the inside thereof.

The image processing integrated circuit 120 is, for example, a system-on-chip in which various function modules including a central processing unit (CPU) are incorporated. It is to be noted that, although the head-mounted display 100 further includes such motion sensors as a gyro sensor, an acceleration sensor, and an angular acceleration sensor, a main memory such as a dynamic random access memory (DRAM), an audio circuit for generating sound to be heard by the user, a peripheral apparatus interface circuit for connecting a peripheral apparatus, and so forth, illustration of them is omitted.

In order to implement AR or MR with a head-mounted display of the shielded type, generally a captured image by the stereo camera 110 or the like is fetched into a main constituent that processes content and is synthesized with a virtual object by the main constituent to generate a display image. In the system depicted, since the main constituent that processes content is the content processing apparatus 200, an image captured by the stereo camera 110 is transmitted once into the content processing apparatus 200 via the image processing integrated circuit 120 as indicated by an arrow mark B.

Then, the image is processed such as synthesized with a virtual object and returned to the head-mounted display 100, where it is displayed on the display panel 122. On the other hand, in the present embodiment, in the see-through mode, a path of data different from that for processing of content is provided. In particular, an image captured by the stereo camera 110 is suitably processed by the image processing integrated circuit 120 as indicated by an arrow mark A and is displayed as it is on the display panel 122. At this time, the image processing integrated circuit 120 carries out only a process for correcting the captured image so as to have a format suitable for display.

According to the path of the arrow mark A, since the transmission path of data can be shortened significantly in comparison with that of the arrow mark B, the period of time after capturing of an image till displaying can be reduced and the power consumption related to transmission can be reduced. Furthermore, in the present embodiment, the correction process by the image processing integrated circuit 120 is carried out concurrently with capturing without waiting for capturing for one frame by the stereo camera 110, and the corrected image is sequentially outputted to the display panel 122.

With the configuration described above, a captured image corresponding to the orientation of the face of the user can be displayed immediately, and a state similar to a state in which the user sees the surroundings without the intervention of the display can be generated. It is to be noted that the path of the arrow mark A can be utilized not only in the see-through mode but also when an image generated by the content processing apparatus 200 and a captured image are synthesized. In particular, only data of an image to be synthesized is transmitted from the content processing apparatus 200 and is synthesized with a captured image by the image processing integrated circuit 120 of the head-mounted display 100 and then outputted to the display panel 122.

Accordingly, it is sufficient if, in place of data of the captured image, only information related to an actual space and acquired from the captured image is transmitted from the head-mounted display 100 to the content processing apparatus 200. As a result, the period of time and the power consumption for data transmission can be reduced in comparison with those in an alternative case in which the data itself of the captured image is transmitted to and used for synthesis in the content processing apparatus 200.

It is to be noted that, in the case where the content processing apparatus 200 uses the information relating to the actual space acquired by analyzing the captured image to generate the image to be synthesized, the content processing apparatus 200 may transmit following pieces of information along with the image to be synthesized: information indicating the information relating to the actual space acquired by analyzing the captured image at what point of time is used, information indicating when the synthesis is to be performed, and information indicating a permissible delay time of the synthesis. This enables the image processing integrated circuit 120 and the content processing apparatus 200 to appropriately control the timing to perform the synthesis with the captured image.

Figure 4:
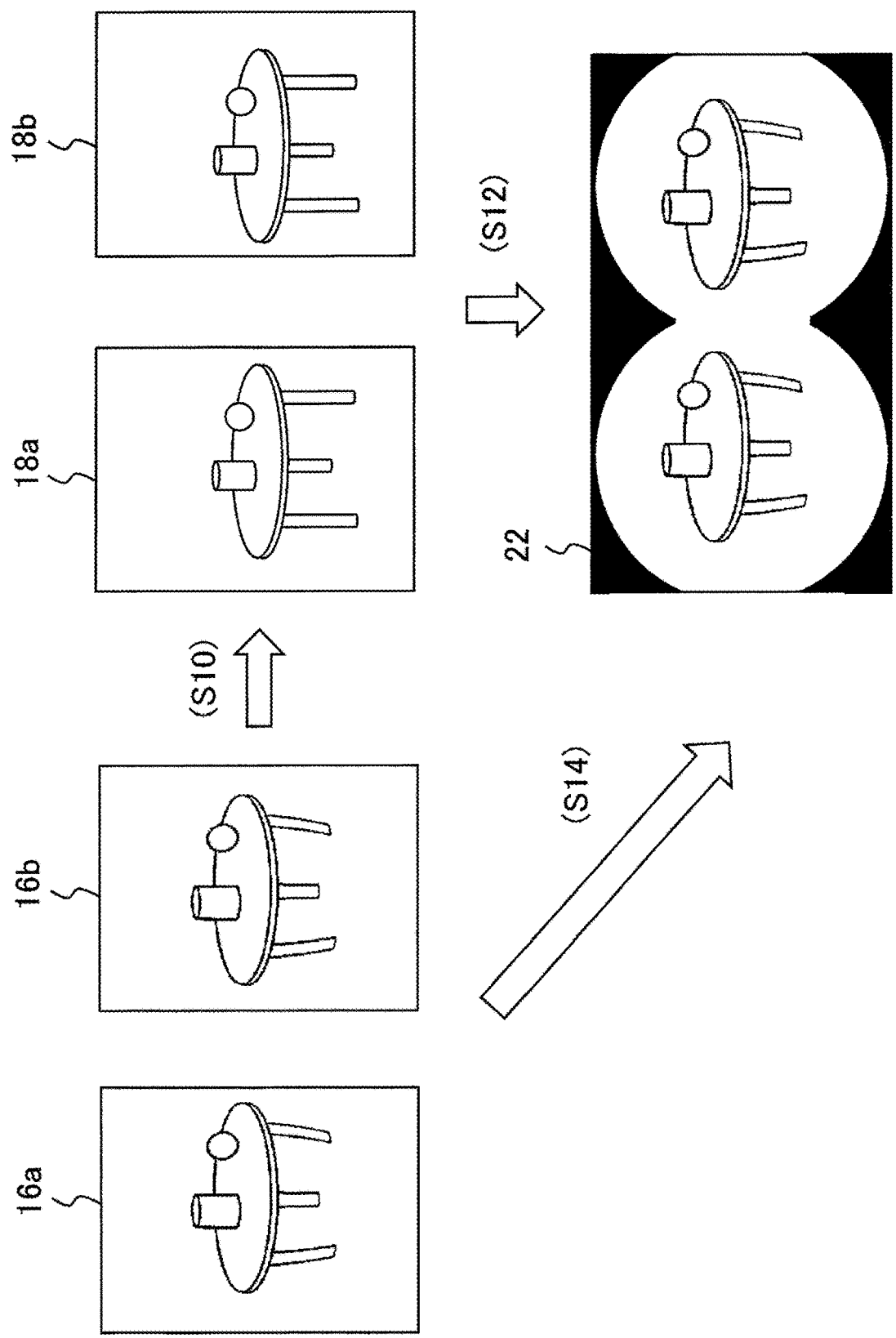
FIG. 4 is a view illustrating a process for generating a display image from a captured image by an image processing integrated circuit according to the present embodiment.

FIG. 4 is a view illustrating a process by the image processing integrated circuit 120 for generating a display image from a captured image. It is assumed that, in an actual space, a table on which an article is placed exists in front of the user. The stereo camera 110 images the table to acquire a captured image 16a of a left visual point and a captured image 16b of a right visual point. Due to the parallax of the stereo camera 110, the captured images 16a and 16b indicate a displacement in a horizontal direction between positions of figures of the same imaging target.

Further, due to lenses of the camera, distortion aberration occurs in the figures of the imaging target. Generally, such lens distortion is corrected to generate an image 18a of the left visual point and an image 18b of the right visual point that are free from distortion (S10). Here, if position coordinates (x, y) of a pixel in the original captured images 16a and 16b are corrected to position coordinates (x+Δx, y+Δy) in the images 18a and 18b after the correction, then a displacement vector (Δx, Δy) can be represented by the following general formula.

[Math. 1]

$$\Delta x = (k_1 r^2 + k_2 r^4 + k_3 r^6 + \ldots)(x - c_x)$$

$$\Delta y = (k_1 r^2 + k_2 r^4 + k_3 r^6 + \ldots)(y - c_y) \quad \text{(formula 1)}$$

Here, r is a distance from an optical axis of a lens to a target pixel on an image plane, and $(c_x, c_y)$ is a position of the optical axis of the lens. Further, $k_1, k_2, k_3, \ldots$ are lens distortion coefficients and rely upon design of the lens. An upper limit of the dimension number is not restricted specifically. It is to be noted that the formula to be used for correction in the present embodiment is not restricted to the formula 1. In a case where an image is displayed on a flat panel display or image analysis is performed, a general image corrected in such a manner as described above is used. On the other hand, in order that the images 18a and 18b free from distortion are viewed on the head-mounted display 100 when they are viewed through the eyepieces, it may be necessary to provide distortion reverse to the distortion due to the eyepieces.

For example, in the case of a lens through which four sides of an image look recessed like a pincushion, an image is distorted to a barrel shape in advance. Accordingly, by distorting the images 18a and 18b free from distortion so as to correspond to the eyepieces and connecting them horizontally in accordance with a size of the display panel 122, a final display image 22 is generated (S12). The relation between figures of an imaging target in left and right regions of the display image 22 and figures of the imaging target in the images 18a and 18b free from distortion before the correction is equivalent to the relation between an image having lens distortion of the camera and an image in which the distortion is corrected.

Accordingly, based on an inverse vector of the displacement vector (Δx, Δy) in the formula 1, a figure having distortion in the display image 22 can be generated. However, naturally a variable relating to the lens is a value of the eyepieces. The image processing integrated circuit 120 in the present embodiment completes removal and addition of distortion taking such two lenses into consideration by single time calculation (S14). In particular, a displacement vector map is generated in advance which represents displacement vectors that indicate to which positions in the display image 22 pixels on the original captured images 16a and 16b are to be displaced by correction on the image plane.

If the displacement vector when distortion due to the lens of the camera is removed is represented by (Δx, Δy) and the displacement vector when distortion is added for the eyepieces is represented by (−Δx', −Δy'), then the displacement vector held at each position by the displacement vector map is (Δx−Δx', Δy−Δy'). It is to be noted that, since the displacement vector merely defines a direction of displacement and a displacement amount of a pixel, if such parameters can be determined in advance, then not only correction arising from lens distortion but also various corrections or combinations can be implemented readily by a similar configuration.

For example, also correction for scaling the captured images 16a and 16b to adjust the sizes of them to the size of the display panel 122 or correction of chromatic aberration taking an array of colors of light emitting elements in the display panel 122 into consideration may be included in elements of the displacement vector. In this case, too, by determining displacement vectors in correction of the positions on the image plane and summing the displacement vectors, a final displacement vector map can be generated. A plurality of corrections can thus be carried out by single time processing. When the display image 22 is to be generated, the displacement vector map is referred to to move the pixels at the positions of the captured images 16a and 16b by amounts given by the displacement vectors.

Since the captured images 16a and 16b and the display image 22 do not indicate a great change in position or shape in which a figure appears although a displacement corresponding to the distortion is indicated, it is possible to acquire and correct pixel values in parallel to acquisition of the pixel values of a captured image in order downwardly from a top row of the image plane. Then, by outputting the pixel values in order from an upper stage to the display panel 122 in parallel to the correction process, display with small delay can be implemented.

However, in place of the displacement vector map described above, a conversion formula for deriving a positional relation between corresponding pixels in the image to which distortion is provided and the captured image. Further, a factor for determining a pixel value of a display image is not restricted to displacement of a pixel depending upon presence or absence of distortion. For example, the following parameters are suitably combined to determine a pixel value:

1. the posture of the user or the direction the user is facing based on output values of the motion sensors not depicted or on a result of calculation of the SLAM;
2. the distance between left and right pupils unique to the user (distance between the eyes); and
3. a parameter that is determined as a result of adjustment of the mounting mechanism unit 104 (mounting band 106) of the head-mounted display 100 on the basis of the relation of the head or the eyes of the user.

The distance between the pupils of the item 2 above is acquired in the following manner. In particular, in a case where the head-mounted display 100 has a gaze tracking stereo camera built therein, the pupils of the user wearing the head-mounted display 100 are imaged by the gaze tracking stereo camera. As an alternative, the user points the stereo camera 110 provided on the front face of the head-mounted display 100 at the face of the user itself to capture an image of the face with the eyes open. As another alternative, a camera not depicted outside the content processing system is pointed at the user to capture an image of the face with the eyes open. The image captured in this manner is processed by pupil image recognition software that operates in the content processing system to automatically measure and record the distance between the pupils.

In a case where an inter-camera distance of the gaze tracking stereo camera or the stereo camera 110 is used, triangulation is performed. As an alternative, the content processing system displays a captured image on the flat panel display 302 and, if the user designates positions for the left and right pupils, then the content processing apparatus 200 calculates and records the distance between the left and right pupils on the basis of the designation. The user may otherwise register the distance between its own pupils directly. The distance between the pupils acquired in this manner is reflected on the distance between the left eye image and the right eye image of the display image 22 of FIG. 4.

In regard to the item 3 above, such measuring instruments as a rotary encoder or a rotary volume not depicted, which is built in the head-mounted display 100, acquire a result of mechanical adjustment of the mounting mechanism unit 104 or the mounting band 106. The content processing system calculates a distance or an angle from the eyepieces to the eyes on the basis of the adjustment result. The parameters acquired in this manner are reflected on a magnification power of an image or the position of a figure in the display image 22 of FIG. 3.

The items 1 to 3 above are parameters unique to the user who wears the head-mounted display 100 or parameters that change arbitrarily such as the position or the posture of the user, and it is difficult to reflect them on a map in advance. Accordingly, the conversion performed with reference to the displacement vector map and the conversion based on at least one of the parameters of the items 1 to 3 above may be combined to determine a final pixel value. As an alternative, a displacement vector map may be generated dynamically in response to the parameters.

Figure 5:
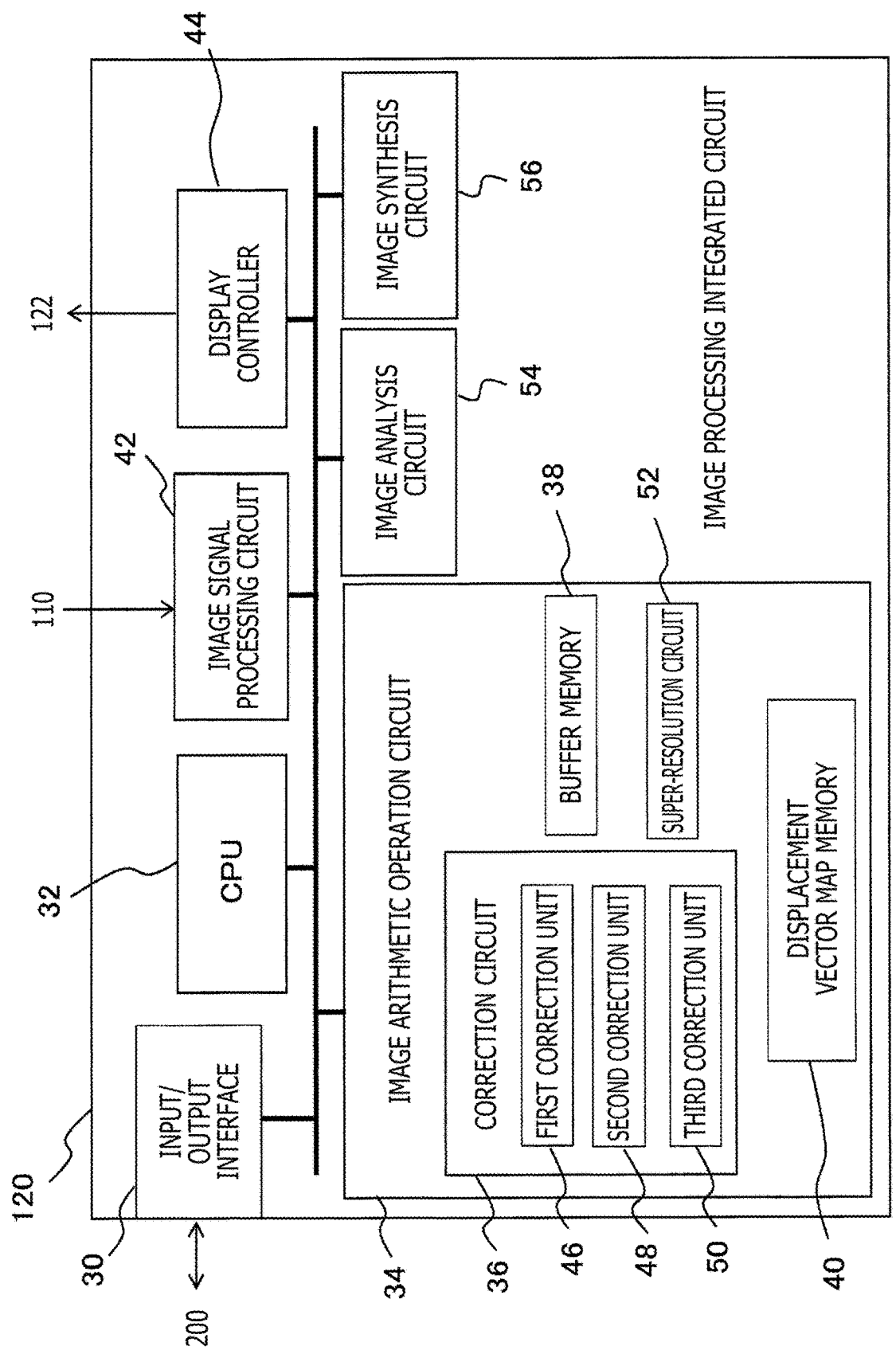
FIG. 5 is a view depicting a circuit configuration of the image processing integrated circuit.

FIG. 5 depicts a circuit configuration of the image processing integrated circuit 120 in the present embodiment. However, FIG. 5 depicts only the configuration relating to the present embodiment but omits the other matters. The image processing integrated circuit 120 includes an input/output interface 30, a CPU 32, an image signal processing circuit 42, an image arithmetic operation circuit 34, an image analysis circuit 54, an image synthesis circuit 56, and a display controller 44.

The input/output interface 30 establishes communication with the content processing apparatus 200 by wired or wireless communication to implement transmission and reception of data. The CPU 32 is a main processor that processes signals such as an image signal and a sensor signal, commands, and data and outputs a result of the process and controls the other circuits. The image signal processing circuit 42 acquires data of a captured image from the left and right image sensors of the stereo camera 110 and carries out suitable processes such as a demosaic process for the data. However, the image signal processing circuit 42 does not carry out lens distortion correction and stores the data in a pixel column order in which pixel values are determined into a buffer memory 38 hereinafter described. The image signal processing circuit 42 is synonymous with an image signal processor (ISP).

The image arithmetic operation circuit 34 cooperates with the CPU to perform a super-resolution process for providing very high definition to an image generated by the content processing apparatus 200, an image transformation process, and other processes of editing an image, not depicted. In the image transformation process, the image arithmetic operation circuit 34 dynamically generates a displacement vector map on the basis of amounts and directions by and in which the gaze of the user has moved in a period of time used to perform the correction process, scaling, and transfer of an image from the content processing apparatus 200 or the stereo camera 110 to the image processing integrated circuit 120 depicted in FIG. 4. Then, the image arithmetic operation circuit 34 uses the displacement vector map to correct and transform the image in accordance with the gaze of the user.

Particularly, the image arithmetic operation circuit 34 includes a correction circuit 36, a buffer memory 38, a displacement vector map memory 40, and a super-resolution circuit 52. A first correction unit 46 of the correction circuit 36 corrects a captured image to generate a display image having distortion for the eyepieces. A second correction unit 48 corrects an image formed by synthesis of an image transmitted from the content processing apparatus 200 and the captured image to generate a display image. A third correction unit 50 corrects, when an image transmitted from the content processing apparatus 200 does not have distortion for the eyepieces in advance, the image to generate a display image having the distortion for the eyepieces.

The buffer memory 38 temporarily stores data of the image before correction by the first correction unit 46, the second correction unit 48, and the third correction unit 50. The displacement vector map memory 40 stores a displacement vector map. It is to be noted that the buffer memory 38 and the displacement vector map memory 40 may be configured integrally with the main memory. The super-resolution circuit 52 carries out a super-resolution process for increasing the definition by a predetermined method for the captured image and the image transmitted from the content processing apparatus 200.

The correction circuit 36 corrects an image by displacing each pixel in a captured image by an amount corresponding to a displacement vector. A target for setting a displacement vector in the displacement vector map may be all pixels in the captured image plane or may be only discrete pixels at predetermined distances.

In the latter case, the correction circuit 36 first determines a displacement destination in regard to pixels to which a displacement vector is set and determines a displacement destination of the remaining pixels by interpolation on the basis of the positional relations to the pixels. In a case where chromatic aberration is corrected, since the displacement vector differs among the primary colors of red, green, and blue, three displacement vector maps are prepared. Further, for a pixel whose value is not determined by such displacement of the pixel in the display image, the correction circuit 36 determines a pixel value by suitable interpolation of pixel values of surrounding pixels.

The correction circuit 36 may refer to a user interface (UI) plane image (or also called on-screen display (OSD) plane image) stored separately in the buffer memory 38 to synthesize (superimpose) the UI plane image with the captured image. The synthesis is performed between the UI plane image after correction on the basis of the displacement vector map and the captured image after correction on the basis of the displacement vector map. As the UI plane image, an image after correction with the displacement vector map may be stored in advance in the buffer memory 38, or a displacement vector map for a UI plane image and a UI plane image having no distortion may be stored in advance such that correction of the UI plane image in which the displacement vector map and the UI plane image are referred to is carried out in parallel to correction of the captured image.

The correction circuit 36 successively outputs the pixel values determined in such a manner as described in order downwardly from the top row. When the correction circuit 36 outputs data to the display controller 44, actually a handshake controller not depicted or the like is utilized to appropriately control communication between them. In particular, the correction circuit 36 may have a built-in handshake controller not depicted. The handshake controller normally monitors the position in the buffer memory 38 to which data is written by the image signal processing circuit 42, whether the pixel amount stored in the buffer memory 38 satisfies an amount used to determine pixel values for one row of the display image in the captured image, and the position in the buffer memory 38 from which the correction circuit 36 reads out data, and prevents occurrence of lack of data, namely, buffer underrun, or data overflow, namely, buffer overrun.

In a case where buffer underrun or buffer overrun should occur, this is notified to the CPU 32. The CPU 32 performs notification of occurrence of abnormality to the user and a restarting process of transfer. The display controller 44 sequentially converts the sent out data into an electric signal to drive the pixels of the display panel 122 at suitable timings to display an image.

The image analysis circuit 54 cooperates with the CPU 32 to analyze a captured image to acquire predetermined information. A result of the analysis is transmitted to the content processing apparatus 200 through the input/output interface 30. The image synthesis circuit 56 cooperates with the CPU 32 to synthesize the image transmitted from the content processing apparatus 200 with the captured image corrected by the first correction unit 46. The image after the synthesis is stored into the buffer memory 38 and corrected by the second correction unit 48.

Figure 6:
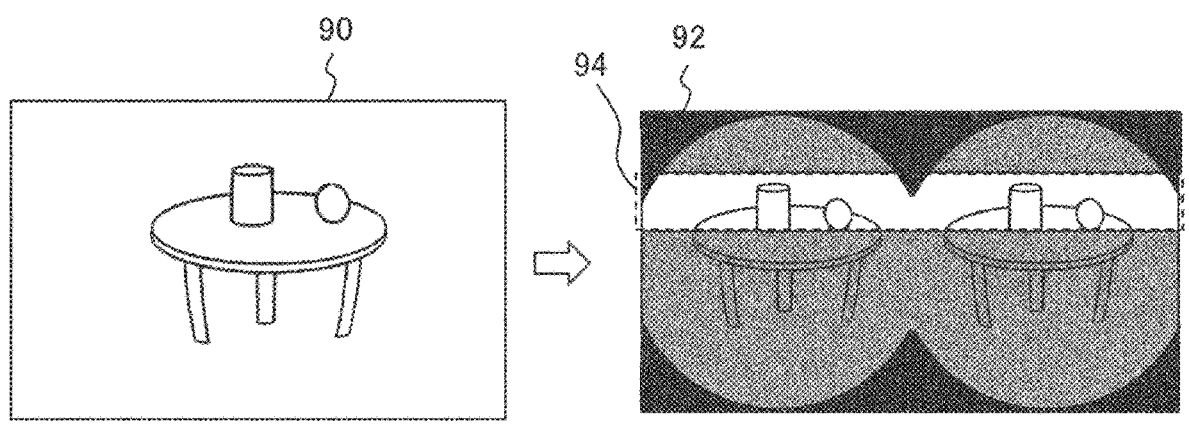
FIG. 6 is a view illustrating a procedure of a displaying process in a see-through mode in the present embodiment.

FIG. 6 is a view illustrating a procedure of a displaying process in the see-through mode of the present embodiment. First, the image signal processing circuit 42 processes a captured image 90 inputted from the image sensor sequentially downwardly from the top row and stores the processed captured image 90 into the buffer memory 38. Consequently, the correction circuit 36 generates a display image 92 to which distortion has been provided as described hereinabove with reference to FIG. 4. Here, the correction circuit 36 starts generation of the display image 92 without waiting that the captured image 90 for one frame is all stored into the buffer memory 38.

If, at a point of time when data of pixels of the number of rows used to determine pixel values for one row of the display image 92 from within the captured image 90 are stored into the buffer memory 38, drawing of the rows is started, then latency till displaying can be suppressed more. For example, if pixel values of a certain row 94 in the display image 92 are determined at a certain timing, then a corresponding row of the display panel 122 is driven by an electric signal based on the pixel values. Thereafter, by repeating a similar process toward the bottom of the image, the entire display image 92 is displayed. Although the description given above relates to the case of the see-through mode, by performing the similar process in correction at individual stages performed by the correction circuit 36, the delay time in each process can be suppressed.

FIGS. 7A and 7B are views illustrating significance of the present embodiment during a period of time after an image free from distortion is generated by processing until it is displayed. In FIGS. 7A and 7B, the axis of abscissa indicates lapse of time, and a drawing time period of a display image by the correction circuit 36 or the like is indicated by a solid line arrow mark and an outputting time period to the display panel 122 is indicated by a broken line arrow mark. Further, in regard to description in parentheses indicated together with "drawing" or "outputting," processing for one frame of a frame number m is represented as (m), and processing of the nth row in the frame number m is represented as (m/n). FIG. 7A indicates a mode for comparison in which a captured image for one frame is outputted to the display panel after it is inputted.

In particular, after time t0 till time t1, the first frame is drawn and data of the first frame is stored into the main memory. At time t1, drawing of the second frame is started and the first frame is sequentially read out from the main memory and outputted to the display panel 122. The process mentioned is completed at time t2, and then the third frame is drawn and the second frame is outputted. Therefore, each frame is drawn and outputted in a same cycle. In this case, the time taken after drawing of the display image for one frame is started until outputting thereof is completed is equal to the outputting cycle for two frames.

According to the present embodiment indicated in FIG. 7B, at a point of time when drawing of data of the first row of the first frame is completed, the data is outputted to the display panel 122. Since data of the second row is drawn in the meantime, data of the second row can be outputted to the display panel 122 following the data of the first row. If this is repeated, then at time t1 at which drawing of the last (nth row) data is completed, outputting of the preceding (n−1th row) data has been completed. Outputting also of the succeeding frames to the display panel 122 is progressed in parallel to the drawing process.

As a result, the time taken after drawing of the display image for one frame is started until outputting thereof is completed is a value equal to the sum of an outputting time period for data of one row and the outputting cycle for one frame. In other words, if the mode of FIG. 7B is compared with the mode of FIG. 7A, then the required time period is reduced by Δt that is proximate to the outputting cycle for one frame. Consequently, an image can be displayed with very small delay.

Figure 8A:
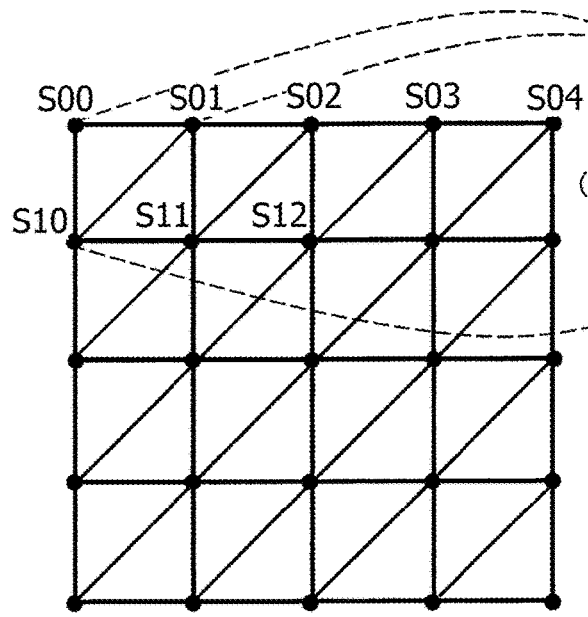
FIGS. 8A and 8B are views illustrating an example of a processing procedure for correcting a captured image by a correction circuit according to the present embodiment.
Figure 8B:
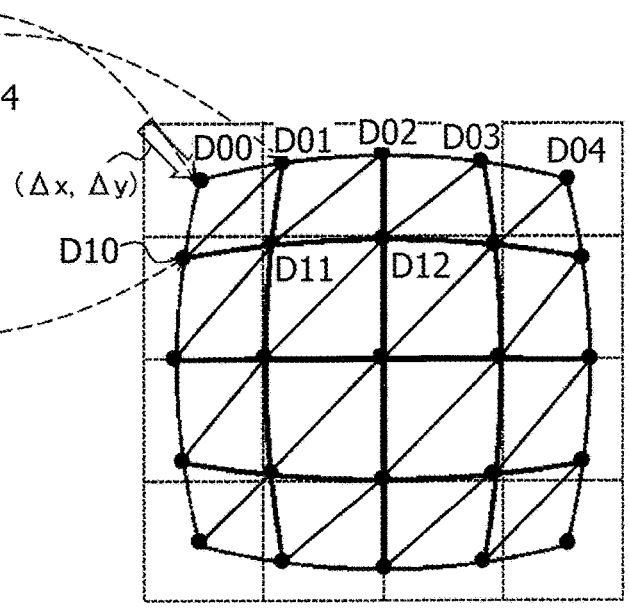

FIGS. 8A and 8B are views illustrating an example of a processing procedure of the correction circuit 36 for correcting a captured image. FIG. 8A depicts a captured image, and FIG. 8B depicts a plane of a display image. Reference symbols S00, S01, S02, . . . in the captured image plane represent positions at which a displacement vector is to be set in the displacement vector map. For example, displacement vectors are set discretely in the horizontal direction and the vertical direction of the captured image plane (for example, at equal distances such as for each 8 pixels or for each 16 pixels). Reference symbols D00, D01, D02, . . . in the display image plane represent positions of displacement destinations of S00, S01, S02, . . . , respectively. In FIGS. 8A and 8B, as an example, a displacement vector (Δx, Δy) from S00 to D00 is indicated by a white arrow mark.

The correction circuit 36 maps a captured image to a display image in a unit of a minimum triangle having a vertex at a pixel for which a displacement vector is to be set. For example, a triangle having vertices at S00, S01, and S10 of the captured image is mapped to a triangle having vertices at D00, D01, and D10 of the display image. Here, a pixel in the inside of the triangle is displaced to a position interpolated by linear, bilinear, or trilinear interpolation or the like in response to the distance to D00, D01, or D10. Then, the correction circuit 36 reads out the values of the corresponding pixels of the captured image before correction stored in the buffer memory 38 to determine pixel values of the display image. Thereupon, values of a plurality of pixels within a predetermined range from a position of a reading out target in the captured image are interpolated by bilinear or trilinear interpolation or the like to derive pixel values of the display image.

Figure 9:
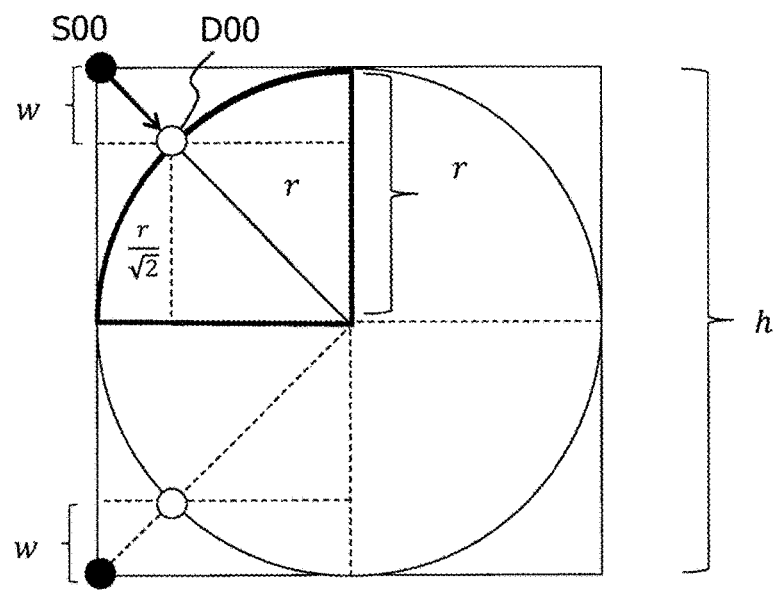
FIG. 9 is a view illustrating a capacity of a buffer memory used for the correction process.

Consequently, the correction circuit 36 can draw the display image in a raster order in a unit of a triangle that is a displacement destination of a triangle of the captured image. Also, in a case where a resolution is adjusted, it is sufficient if pixels are sequentially mapped for each minimum triangle similarly. In a case where chromatic aberration is to be corrected, a displacement vector map is used for each primary color, and the position or the shape of a triangle of a displacement destination changes by a very small amount. FIG. 9 is a view illustrating a capacity of the buffer memory used for a correction process in the present embodiment. FIG. 9 depicts a case where an image after correction has a circular shape as a case in which correction may be required most.

It is assumed that a size of an image before correction in the vertical direction is h and a radius of an image after correction is r (=h/2). The distance of displacement by correction is greatest at pixels at four corners in the image before the correction. For example, the pixel at the left upper position S00 is displaced in a radial direction of the lens by the correction and appears at the position D00 on a circumference of the image after the correction. Therefore, it may be necessary to keep the data of the pixel at the position S00 until the pixel at the position D00 is drawn. The distance $w=r-r/2^{1/2}$ from the position S00 to the position D00 in the vertical direction is approximately 15% of the size h of the image before the correction.

For example, in the case of a captured image having 2160 pixels in the vertical direction, a region for storing data of 15% of the captured image, namely, data for 324 rows, may be required for the buffer memory 38. Further, the period of time taken after the position S00 is imaged until the position D00 is outputted changes in proportion to the distance w. For example, if the frame rate is 120 fps, then the delay time after imaging till outputting is 1.25 msec. However, the values mentioned are maximum values to the last, and generally a smaller capacity and a shorter delay time are applicable. Further, in comparison with the path of the arrow mark B in FIG. 3, the processing delay time can be reduced significantly. It is to be noted that, in the buffer memory 38, also a region for the correction process, a region for additional pixels in the case of increasing the resolution, and so forth may be required.

In any case, in the present embodiment, since a correction process is sequentially performed and a result of the correction process is outputted to the display panel 122 before data for one frame of a captured image is acquired, display with a very short period of delay time becomes possible.

Further, since the memory capacity to be used can be reduced significantly from the data size for one frame, it becomes possible to incorporate a buffer memory of a small capacity such as a static random access memory (SRAM) at a position close to the correction circuit 36, and time and power consumption for data transmission can be suppressed.

Figure 10:
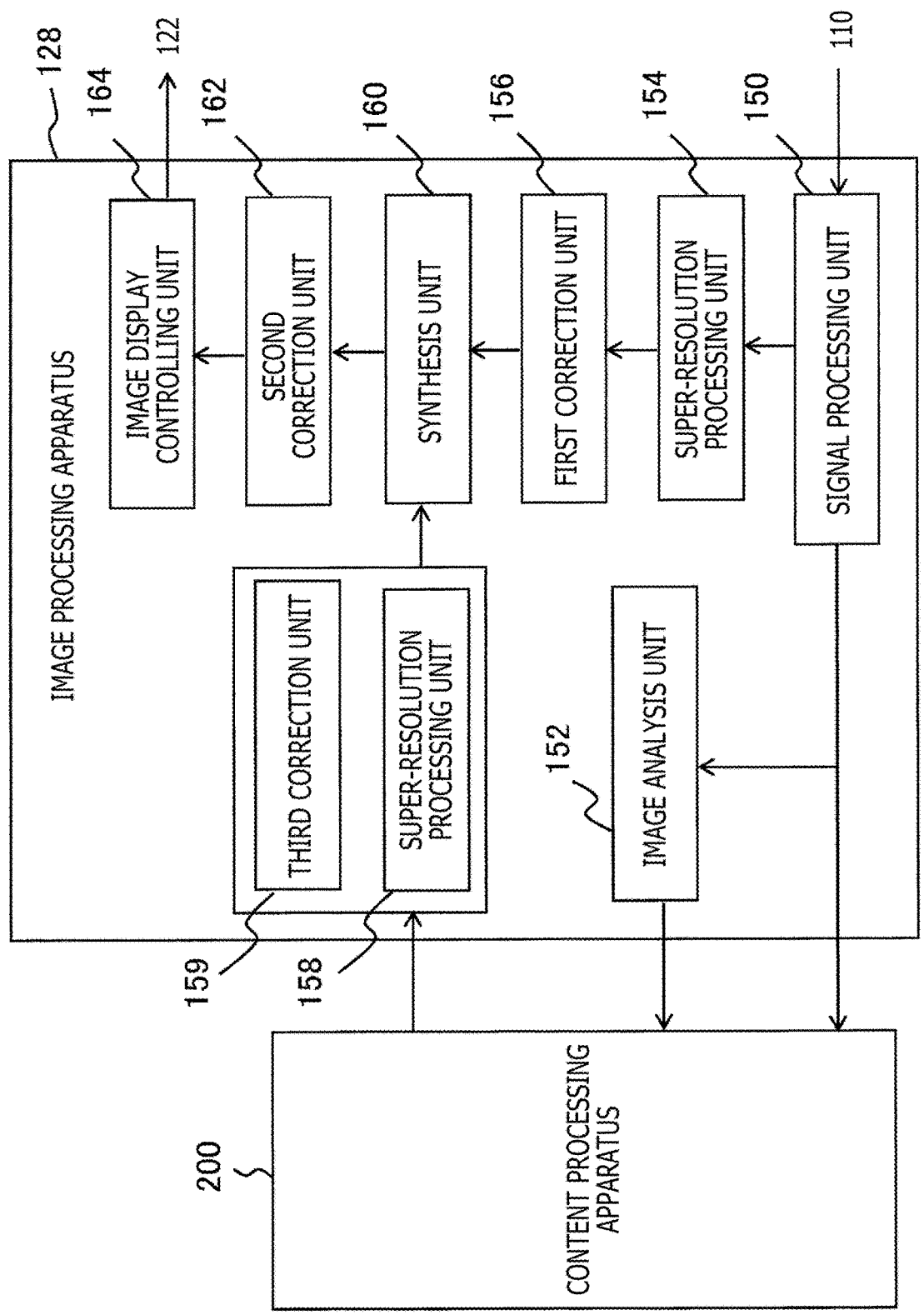
FIG. 10 is a view depicting a configuration of functional blocks of an image processing apparatus in a case where the image processing integrated circuit of the present embodiment is used for a display mode other than the see-through mode.

Now, a method of implementing processing and synthesis of a captured image in the image processing integrated circuit 120 when an image transmitted from the content processing apparatus 200 and the captured image are synthesized is described. FIG. 10 depicts a configuration of functional blocks of an image processing apparatus 128 built in the head-mounted display 100, together with the content processing apparatus 200. The functional blocks depicted in FIG. 10 can be implemented, in hardware, by such a configuration of the image processing integrated circuit 120 and so forth depicted in FIG. 5 and, in software, by a program that is loaded from a recording medium or the like into the main memory or the like and demonstrates various functions such as a data inputting function, a data holding function, an image processing function, and a communication function.

Accordingly, it can be recognized by those skilled in the art that the functional blocks can be implemented in various forms, for example, only by hardware, only by software, or a combination of them and are not restrictive. It is to be noted that the configuration of the entire system may be similar to that depicted in FIG. 3. In this example, the image processing apparatus 128 includes a signal processing unit 150, an image analysis unit 152, super-resolution processing units 154 and 158, a first correction unit 156, a third correction unit 159, a synthesis unit 160, a second correction unit 162, and an image display controlling unit 164.

The signal processing unit 150 is implemented by the image signal processing circuit 42 of FIG. 5, and acquires data of a captured image from the image sensor of the stereo camera 110 and performs suitable processing for the data. The image analysis unit 152 is implemented by the CPU 32, the image analysis circuit 54, and the input/output interface 30 of FIG. 5, and analyzes a captured image to acquire predetermined information and transmits the predetermined information to the content processing apparatus 200. For example, the image analysis unit 152 determines a distance to an imaging target by stereo matching using left and right captured images and generates a depth map in which such distances are represented as pixel values on an image plane. The position or posture of the head-mounted display 100 may be acquired by SLAM.

Furthermore, it can be recognized by those skilled in the art that various contents are available for the image analysis. However, in some cases, data itself of a captured image processed by the signal processing unit 150 may be transmitted to the content processing apparatus 200. In this case, the signal processing unit 150 includes the input/output interface 30 of FIG. 5. Further, an analysis result by the image analysis unit 152 and measurement values of the motion sensors not depicted built in the head-mounted display 100 are used also in the image transformation process described hereinabove. In particular, a movement of the gaze of the user in a period of time taken for processing in the inside of the head-mounted display 100 and data transfer to and from the content processing apparatus 200 is specified on the basis of such parameters and dynamically reflected on the displacement vector map.

The super-resolution processing unit 154 is implemented by the CPU 32 and the super-resolution circuit 52 of FIG. 5 and carries out a super-resolution process for providing very high definition to a captured image by a predetermined method. For example, an image obtained by displacing a captured image with a width smaller than one pixel in the horizontal and vertical directions of the image plane and the image before the displacement are synthesized to sharpen the image. For the super-resolution process, various other methods have been proposed, and any of them may be adopted.

The super-resolution processing unit 158 performs a super-resolution process similar to that by the super-resolution processing unit 154 for an image transmitted from the content processing apparatus 200. Here, the image transmitted from the content processing apparatus 200 may be an image to be synthesized with a captured image or an image to be displayed without being synthesized. The content processing apparatus 200 draws an image using a depth map or the like transmitted from the head-mounted display 100. This makes it possible to draw an image according to the relation between the imaging plane of the stereo camera 110 and the position or posture of an imaging target and eventually to the relation between the face of the user and the position or orientation of the imaging target.

In a case where an image to be synthesized with a captured image is drawn, for example, an image is generated in which a virtual object is drawn at an appropriate position and in an appropriate posture while the other region is filled with a predetermined color. Consequently, the virtual object can be displayed in an overlapping relation at an appropriate position of the captured image by a general chroma key technology. Alternatively, an α value indicative of transparency may be utilized to simultaneously generate an α image in which the α value is set to α=0 in any other region than the virtual object. In this case, the virtual object can be displayed in an overlapping relation at an appropriate position by an alpha blend process with the captured image.

The first correction unit 156 is implemented by the CPU 32 and the first correction unit 46 of FIG. 5, and corrects a captured image as indicated by S14 of FIG. 4 to generate a display image having distortion for the eyepieces. However, in a case where an image transmitted from the content processing apparatus 200 is synthesized, the first correction unit 156 does not perform chromatic aberration correction. In particular, same distortion is provided to all primary colors. Images of red, green, and blue are all corrected using a displacement vector map having been generated for green taking a characteristic of the eyes of a human being who views the display panel into consideration. In addition, in a case where a RAW image acquired by the image sensor has a Bayer array, the image of green of the highest pixel density can be used.

In the case of the see-through mode in which a captured image is displayed without being synthesized with another image, a display image for which up to chromatic aberration correction is performed all at once by the first correction unit 156 as described above may be generated. In particular, using the respective displacement vector maps prepared for red, green, and blue, captured images of the colors are corrected. The third correction unit 159 is implemented by the CPU 32 and the third correction unit 50 of FIG. 5, and in a case where an image transmitted from the content processing apparatus 200 does not have distortion for the eyepieces in advance, the third correction unit 159 performs a correction process similar to that by the first correction unit 156 for the image. It is to be noted that the third correction unit 159 may perform correction for an image for which a super-resolution process has been performed by the super-resolution processing unit 158, and the super-resolution processing unit 158 may carry out a super-resolution process for an image corrected by the third correction unit 159.

The synthesis unit 160 is implemented by the CPU 32 and the image synthesis circuit 56 of FIG. 5, and synthesizes an image transmitted from the content processing apparatus 200 and having undergone a super-resolution process with a captured image corrected by the first correction unit 156. In the case of an image that presupposes chroma key synthesis as described above, the synthesis unit 160 exchanges pixels in a surrounding region filled with a predetermined color for pixels of a captured image. In a case where an α image is transmitted simultaneously, synthesis is performed using a values of the pixels by a general alpha blend process.

In a case where an image to be displayed without being synthesized is transmitted from the content processing apparatus 200, the synthesis unit 160 may supply data of the transmitted image as they are to the second correction unit 162. Here, the "image to be displayed without being synthesized" is an image that is not to be synthesized with a captured image or an image synthesized already with a captured image by the content processing apparatus 200. The second correction unit 162 is implemented by the CPU 32 and the second correction unit 48 of FIG. 5, and corrects an image inputted from the synthesis unit 160. It is to be noted that the second correction unit 162 carries out only a correction process that has not been carried out from among correction processes to be performed for the display image, in particular, only a correction process of chromatic aberration.

In a case where, in related art, a display image for which up to synthesis is performed by the content processing apparatus 200 is transmitted to the head-mounted display 100 so as to be displayed, chromatic aberration correction is generally performed together with correction for the eyepieces after a synthetic image free from distortion is generated. On the other hand, in the present embodiment, since data paths for a captured image and an image to be synthesized with the captured image are different from each other, the correction process is separated into two stages.

In particular, common distortion corresponding to the eyepieces is provided to an image transmitted from the content processing apparatus 200 and a captured image, and correction is performed for each color after synthesis. In a case where the first correction unit 156 corrects captured images of all primary colors using the displacement vector map for green, the third correction unit 159 carries out same correction for green for the image transmitted from the content processing apparatus 200.

Then, the second correction unit 162 performs further suitable correction for the red and blue images among the images after synthesis to complete an image. By first performing correction with reference to green of a wavelength band to which visual sensitivity of a human being is highest and then performing scaling, super-resolution, synthesis, and so forth and thereafter correcting the aberrations for red and blue, color bleeding or abnormality of a contour becomes less likely to be visually recognized. However, this does not intend to restrict the sequence of colors to be used for correction.

It is to be noted that, in a case where an image to be displayed without being synthesized is transmitted from the content processing apparatus 200, if the image has been subjected to all correction operations suitable for displaying by the content processing apparatus 200, then the second correction unit 162 may not carry out a correction process. However, if some correction has not been carried out, then the second correction unit 162 may carry out final correction. Further, in the case of the see-through mode, the synthesis process of the synthesis unit 160 and the correction process of the second correction unit 162 may be omitted by carrying out suitable correction by the first correction unit 156 as described hereinabove.

The CPU 32 switches a process to be performed by each processing circuit depending upon whether or not the see-through mode is adopted and whether the image is an image to be synthesized with a captured image or an image not to be synthesized with a captured image. This makes it possible to complete a data path for a captured image in the head-mounted display 100 irrespective of whether or not the see-through mode is adopted. Further, by leaving a correction process for chromatic aberration as a process to be performed after synthesis, a boundary line for synthesis can be defined precisely.

In particular, if synthesis is performed after chromatic aberration is corrected, then a boundary line set for an image for chroma key or an a image includes an error depending upon a primary color, and this gives rise to color bleeding in the contour after synthesis. By displacing pixels by a very small amount by chromatic aberration correction after synthesis in a state free from color displacement, a display image having no bleeding on a contour thereof can be generated. In such processes as scaling, super-resolution, and synthesis of an image, generally a filter process such as bilinear or trilinear filter process is used. If such filter processes are carried out after chromatic aberration is corrected, then a result of the chromatic aberration correction is destroyed on the microscopic level and, upon displaying, color bleeding or abnormality of a contour occurs. By performing the process by the second correction unit 162 immediately before displaying, such problems can be avoided. The image display controlling unit 164 is implemented by the display controller 44 of FIG. 5 and sequentially outputs display images generated in this manner to the display panel 122.

Processes of the super-resolution processing units 154 and 158, the first correction unit 156, the third correction unit 159, the synthesis unit 160, the second correction unit 162, and the image display controlling unit 164 can all be carried out without waiting that data in all regions of the image frame are acquired. Accordingly, display with a reduced delay time can be anticipated by sending pixel values to processing by the succeeding stage, immediately after the pixel values are determined, in order from the top row of the image plane similarly as in the see-through mode described hereinabove.

Figure 11:
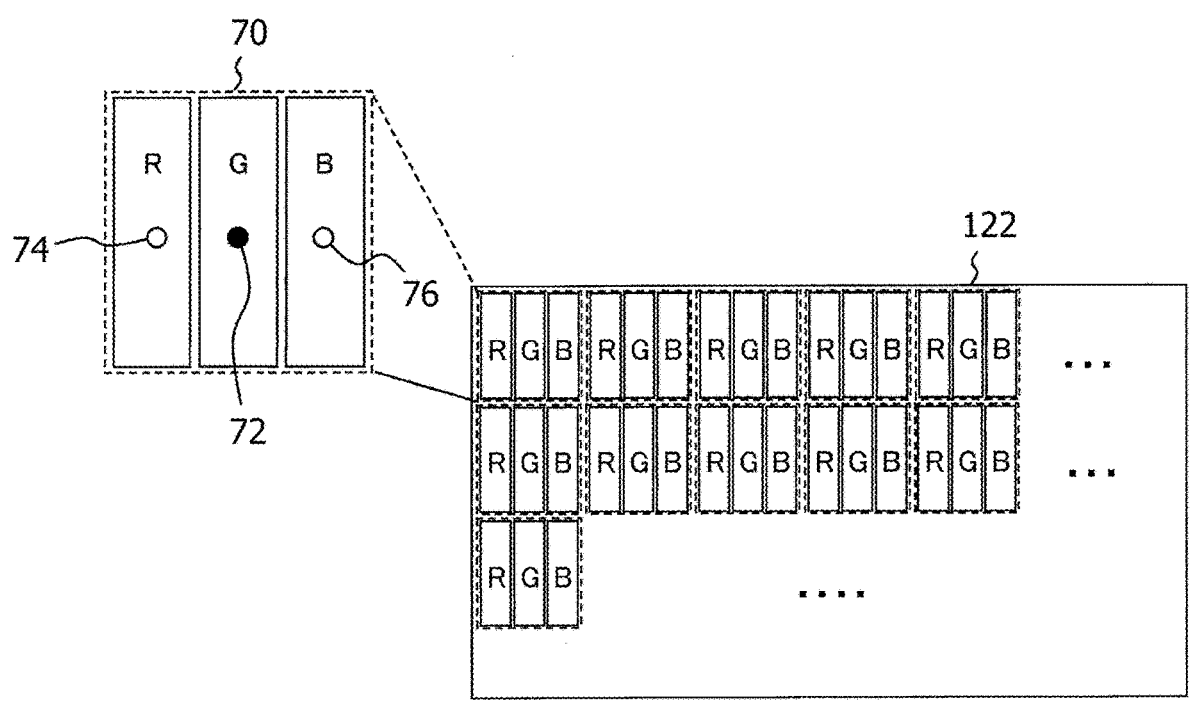
FIG. 11 is a view illustrating an example of elements that are included in a displacement vector for chromatic aberration correction in the present embodiment.

FIG. 11 is a view illustrating an example of elements included in displacement vectors for chromatic aberration correction. As depicted in FIG. 11, in the display panel 122, a pixel is formed by combination of light emitting elements of red (R), green (G), and blue (B). In FIG. 11, one pixel 70 is depicted in an enlarged scale. It is to be noted that the arrangement of light emitting elements varies depending upon the display panel. Although pixel values represented by data of a display image are luminance values of red, green, and blue provided to the entire region of the pixel 70 and strictly represents a color of a figure at a center 72 of the pixel region.

However, in the case of the array depicted in FIG. 11, the luminance of red originally depends upon the color of a figure at a position 74 displaced by a very small amount to the left from the center 72 of the pixel region. Accordingly, by displacing an image of red components from within the display image by the very small amount to the right, also the value of the pixel on the left side is reflected on the luminance of red. Similarly, the luminance of blue originally depends upon the color of a figure at a position 76 displaced by a very small amount to the right from the center 72 of the pixel region. Accordingly, by displacing an image of blue components from within the display image by the very small amount to the left, also the value of the pixel on the right side is reflected on the luminance of blue.

This makes it possible to accurately represent information of the position on the image plane and the color represented at the position in a unit of a subpixel. Since the array of colors of light emitting elements configuring pixels varies depending upon the display panel in this manner, a displacement vector is calculated taking the array into consideration. In the correction of chromatic aberration, a difference in displacement when a distortion coefficient of the eyepieces is made different for each color is included in correction for lens distortion using the formula 1. In particular, axial chromatic aberration or magnification chromatic aberration regarding the lens occurs depending upon the difference in refractive index that depends upon the wavelength of light, and this gives rise to color displacement in a figure. The displacement vector includes a component for correcting this color displacement.

It is to be noted that, for the eyepieces provided in the head-mounted display 100, not only a general convex lens but also a Fresnel lens may be used. Although the Fresnel lens can be formed with a reduced thickness, it is likely to suffer from degradation of the resolution or from image distortion that is likely to increase concentrically toward a periphery of the field of vision, and the luminance can change nonlinearly. This nonlinear concentric luminance change can provide different characteristics to red, green, and blue (for example, refer to "Distortion," Edmund Optics Technical Data, [online], Internet URL: https://www.edmundoptics.jp/resources/application-notes/imaging/distortion/). Therefore, the displacement vector may include a component for correcting this for each color.

On the other hand, in a case where a liquid crystal panel is adopted for the display panel 122, although it is possible to achieve a high resolution, the reaction rate is low. In a case where an organic EL panel is adopted, although the reaction rate is high, it is difficult to achieve a high resolution and a phenomenon called Black Smearing by which color bleeding occurs in a black region and around the black region can occur. The correction circuit 36 may perform correction such that it eliminates such various bad influences by an eyepiece or a display panel in addition to such lens distortion as described above. In this case, the correction circuit 36 retains therein a characteristic of the eyepiece and a characteristic of the display panel 122. For example, in the case of a liquid crystal panel, the correction circuit 36 inserts a black image between frames to reset the liquid crystal thereby to improve the reaction rate. On the other hand, in the case of an organic EL panel, the correction circuit 36 applies an offset to a luminance value or a gamma value for gamma correction to make color bleeding by Black Smearing less outstanding.

Figures 12A, 12B:
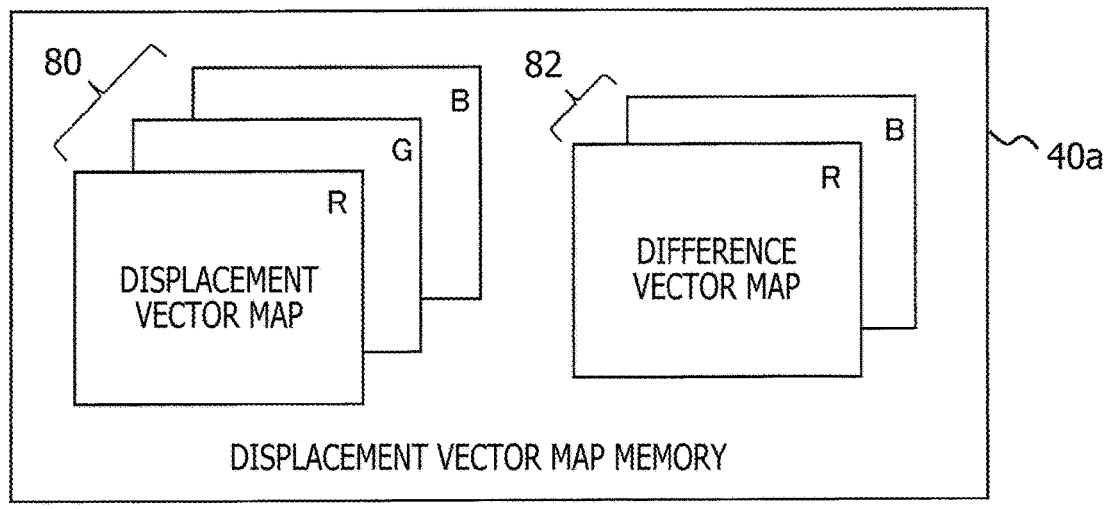
FIGS. 12A and 12B are views schematically depicting data to be stored into a displacement vector map memory in the present embodiment.

FIGS. 12A and 12B schematically depict data stored in the displacement vector map memory 40. A displacement vector map memory 40a depicted in FIG. 12A stores displacement vector maps 80 for red, green, and blue. The displacement vector maps 80 represent displacement of pixels from a captured image to a display image (or images of left and right regions of the display image). The first correction unit 156 refers to the displacement vector maps 80 in the see-through mode to correct images of red, green, and blue components of the captured image to generate a display image.

Further, in the displacement vector map memory 40*a*, difference vector maps 82 that represent, in the image plane, difference vectors for red obtained by subtracting green displacement vectors from red displacement vectors and difference vectors for blue obtained by subtracting green displacement vectors from blue displacement vectors are stored. In a case where an image from the content processing apparatus 200 is to be synthesized, the first correction unit 156 and the third correction unit 159 refer to the green displacement vector map among the displacement vector maps 80 to correct the images of red, green, and blue components of the captured image.

Then, the second correction unit 162 refers to the red and blue difference vector maps to correct the images of the red and blue components after synthesis to generate a final display image. Since chromatic aberration correction requires only that red, green, and blue images are relatively displaced from each other by an appropriate amount, the color of the displacement vector map to be referred to when the first correction unit 156 is to perform correction is not restricted. Then, it is sufficient if difference vector maps for two colors other than the applicable color are generated.

A displacement vector map memory 40*b* depicted in FIG. 12B is different from the displacement vector map memory 40*a* of FIG. 12A in that it stores only the displacement vector map 84 for green as the displacement vector map. In this case, in the see-through mode, the first correction unit 156 first refers to part of the displacement vector map 84 for green and also part of the corresponding difference vector maps 86 for red and blue, which are used for correction of pixels to be processed subsequently, to dynamically generate applicable part of the displacement vector maps 80 for red, green, and blue. Then, the first correction unit 156 performs correction of the image on the basis of the dynamically generated displacement vector values.

As an alternative, in the see-through mode, the first correction unit 156 first refers to the displacement vector map 84 to correct images of the red, green, and blue components of the captured image. Then, the first correction unit 156 refers to the difference vector maps 86 for red and blue to correct the images for the red and blue components from among the images after the correction to generate a final display image. Also in this instance, the color of each map is not restrictive. The configuration of FIG. 12B can reduce the data amount and save the memory capacity compared to the configuration of FIG. 12A.

Now, operation of the head-mounted display that can be implemented by the configuration described above is described. FIG. 13 is a flowchart indicative of a processing procedure when the head-mounted display displays a captured image or the like. It is to be noted that, although FIG. 13 denotes a series of steps serially, actually a next process is started without waiting that processing for one frame at a preceding stage comes to an end as described hereinabove. As a result, the processes are carried out in parallel in regard to different pixel columns.

First, the head-mounted display 100 acquires an original image on which a display image is to be based (S20). Here, the original image includes at least one of a captured image by the stereo camera 110 and an image transmitted from the content processing apparatus 200. The former is an image obtained by performing a demosaic process for a RAW image and is in a state before it is corrected in regard to lens distortion of the camera. The latter may be an image to which distortion for the eyepieces of the head-mounted display 100 is provided or an image to which no such distortion is provided.

Then, the super-resolution processing units 154 and 158 suitably carry out a super-resolution process for the original image (S22). However, if there is no necessity of the super-resolution process, then the process may be omitted. In the case of the see-through mode (Y at S24), the first correction unit 156 uses the displacement vector maps generated in advance for red, green, and blue to correct the images of the red, green, and blue components of the captured image (S26). Then, the first correction unit 156 determines pixel values and sequentially outputs data from the top row of the image plane to the display panel 122 (S36).

Consequently, the captured image is immediately displayed in an appropriate format. On the other hand, in any mode other than the see-through mode (N at S24), in the case where an image transmitted from the content processing apparatus 200 and the captured image are to be synthesized (Y at S28), the first correction unit 156 corrects the images of the red, green, and blue components of the captured image using the displacement vector map generated in advance for green (S30). Also, the third correction unit 159 performs similar correction for the image transmitted from the content processing apparatus 200 as occasion demands. Then, the synthesis unit 160 synthesizes the image transmitted from the content processing apparatus 200 and the captured image (S32).

Then, the second correction unit 162 uses the difference vector maps for red and blue to correct the images of the red and blue components of the synthesis image, respectively (S34). In a case where the captured image is not to be synthesized with the image transmitted from the content processing apparatus 200, if suitable correction has been performed for the transmitted image, then the processes at S30 to S34 can be omitted (N at S28). However, in a case where distortion common to all color components is given, the images of the red component and the blue component are corrected using the difference vector maps at step S34. Then, the second correction unit 162 determines pixel values and sequentially outputs data from the top row of the image plane to the display panel 122 (S36).

It is to be noted that, although the foregoing description is given focusing on processing in the inside of the image processing apparatus 128, processing may be progressed similarly also when data of an image compression-encoded by the content processing apparatus 200 such as a cloud server and streaming transferred from the content processing apparatus 200 are decoded and decompressed by the image processing apparatus 128. In other words, the content processing apparatus 200 and the image processing apparatus 128 may perform compression encoding, decoding decompression, and motion compensation for each of unit regions into which the frame plane is divided.

Here, the unit regions are regions into which the frame plane is divided in the horizontal direction for each predetermined number of rows of pixels such as one row or two rows or are rectangular regions into which the frame plane is divided in both of the vertical and horizontal directions such as 16×16 pixels or 64×64 pixels. The content processing apparatus 200 and the image processing apparatus 128 start a compression encoding process and a decoding decompression process every time data of a processing target for a unit region is acquired, and output data after the process for each of the unit regions. Consequently, the delay time period till displaying including a data transmission time period from the content processing apparatus 200 can be reduced further.

According to the embodiment described above, in a head-mounted display including a camera, a path for processing and displaying a captured image in and on the head-mounted display is provided separately from a path for displaying an image transmitted from a content processing apparatus. This makes it possible to display the captured image with small delay readily during a period during which an image of content is not displayed or the like. As a result, even if the head-mounted display is kept worn by the user, the user can confirm a surrounding situation similar as in the case where the user does not wear the head-mounted display, and the convenience and the safety can be enhanced.

Further, in the present embodiment, various corrections are performed all at once on the basis of a displacement vector map that represents, on an image plane, displacements of pixels by suitable correction factors such as removal of distortion due to a lens of a camera, addition of distortion for an eyepiece, adjustment of the resolution, and chromatic aberration correction. Since such correction operations allow independent processing for each pixel, they can be performed in parallel in pixel column units from imaging to displaying. As a result, in addition to shortening of the path from the camera to the display panel, the time period itself used for the correction process can be shortened. Further, in comparison with an alternative case in which data for one frame are outputted after they are accumulated, not only the memory capacity but also the power consumption for data transmission can be saved.

Also, in a case where an image transmitted from the content processing apparatus is included into a display target, processing for the captured image is completed in the head-mounted display. At this time, the correction process for the captured image is switched to have two stages. In particular, before the image transmitted from the content processing apparatus is synthesized, common correction is carried out for all primary color components, and chromatic aberration is corrected after the synthesis. By carrying out correction of chromatic aberration immediately before displaying, it can be prevented that an image after the chromatic aberration correction is destroyed at the micro level by a filter process used in scaling, super-resolution, synthesis, and so forth and color bleeding or an abnormal contour appears on the display.

Consequently, a synthesis image of high quality can be displayed even if data of a captured image is not transmitted to the content processing apparatus. As a result, advantageous effects similar to those described above can be achieved without having an influence on a result of the display. Further, switching between a mode in which an image from the content processing apparatus is synthesized with a captured image and another mode in which such synthesis is not performed can be performed readily by minimal changes.

The present disclosure has been described in connection with the embodiment thereof. The embodiment described hereinabove is exemplary, and it is recognized by those skilled in the art that variable modifications are possible in regard to combinations of the components or the processes of the embodiment and that also such modifications fall within the scope of the present disclosure.

What is claimed is:

1. An image processing apparatus comprising:
   a signal processing unit configured to acquire data of a captured image;
   a correction unit configured to correct the captured image to an image suitable for display;
   a synthesis unit configured to synthesize an image for synthesis transmitted from an apparatus, which is not provided integrally with the image processing apparatus, with the captured image; and
   an image display controlling unit configured to control a display panel to display the synthesized image,
   wherein the correction unit carries out, from among processes for correcting the captured image to the image suitable for display, part of the correction processes for the captured image before the synthesis by the synthesis unit and carries out remaining correction processes for the image after the synthesis,
   wherein the correction unit carries out, as the part of the correction processes, a common correction process for adding distortion to be provided to a display image to be appreciated through an eyepiece to primary color components of the captured image, and
   wherein the correction unit corrects, as the remaining correction processes, chromatic aberration of the primary color components.

2. The image processing apparatus according to claim 1, further comprising:
   a displacement vector map storage unit configured to store therein
   a displacement vector map that represents, on an image plane, displacement vectors each representative of a displacement amount and a displacement direction of a pixel from the captured image, the displacement vectors being used to carry out the part of the correction processes, and
   a difference vector map that represents, on the image plane, difference vectors each representative of a displacement amount and a displacement direction of a pixel from the image after the synthesis, the difference vectors being used to carry out the remaining correction processes, wherein
   the correction unit refers to the displacement vector map in the correction before the synthesis and refers to the difference vector map in the correction after the synthesis.

3. The image processing apparatus according to claim 2, wherein
   the correction unit refers to the displacement vector map for components of green from among primary colors of the captured image to carry out the part of the correction processes and refers to the difference vector map for components of red and blue to carry out the remaining correction processes.

4. The image processing apparatus according to claim 1, wherein,
   when there is no necessity to synthesize the image for synthesis transmitted from the apparatus that is not provided integrally with the image processing apparatus,
   the correction unit switches such that the processes for correcting the captured image to the image suitable for display are carried out all at once.

5. The image processing apparatus according to claim 1, wherein
   the part of the correction processes includes a correction process for eliminating distortion due to a lens of an imaging apparatus.

6. The image processing apparatus according to claim 1, further comprising:

a super-resolution processing unit configured to carry out a super-resolution process for the captured image before the correction and the image for synthesis before the synthesis.

7. The image processing apparatus according to claim 1, wherein
the correction unit and the synthesis unit determine pixel values and sequentially output data of pixels after processed thereby.

8. The image processing apparatus according to claim 1, further comprising:
a buffer memory configured to store data of pixels generated by the correction by the correction unit in a generation order of the data, wherein
the image display controlling unit controls such that, every time data of a predetermined number of pixels smaller than a total number of pixels of the captured image are stored into the buffer memory, the data are sent out.

9. The image processing apparatus according to claim 8, wherein,
at a point of time at which data of pixels of the number of rows used to determine pixel values for one row of the image after the correction are acquired, the correction unit starts generation of data for the row.

10. The image processing apparatus according to claim 1, wherein
the correction unit corrects the captured image further on a basis of at least one of a posture and an orientation of a user, a distance between pupils of eyes of the user, and a distance between the display panel and the eyes of the user.

11. A head-mounted display comprising:
an image processing apparatus including
a signal processing unit configured to acquire data of a captured image,
a correction unit configured to correct the captured image to an image suitable for display,
a synthesis unit configured to synthesize an image for synthesis transmitted from an apparatus, which is not provided integrally with the image processing apparatus, with the captured image, and
an image display controlling unit configured to control a display panel to display the synthesized image,
the correction unit carrying out, from among processes for correcting the captured image to the image suitable for display, part of the correction processes for the captured image before the synthesis by the synthesis unit and carrying out remaining correction processes for the image after the synthesis;
an imaging apparatus configured to supply a captured image to the signal processing unit; and
the display panel,
wherein the correction unit carries out, as the part of the correction processes, a common correction process for adding distortion to be provided to a display image to be appreciated through an eyepiece to primary color components of the captured image, and
wherein the correction unit corrects, as the remaining correction processes, chromatic aberration of the primary color components.

12. The head-mounted display according to claim 11, further comprising:
an image analysis unit configured to analyze the captured image and transmit a result of the analysis to the apparatus that is not provided integrally with the image processing apparatus, wherein the image for synthesis is generated on a basis of the result.

13. An image displaying method by an image processing apparatus, comprising:
acquiring data of a captured image;
carrying out part of correction processes for correcting the captured image to an image suitable for display;
synthesizing an image for synthesis transmitted from an apparatus, which is not provided integrally with the image processing apparatus, with the captured image for which the part of the correction processes has been carried out;
carrying out, for the image after the synthesis, remaining correction processes from among the correction processes for correcting the captured image to an image suitable for display to generate a display image;
causing a display panel to display the display image;
carrying out, as the part of the correction processes, a common correction process for adding distortion to be provided to a display image to be appreciated through an eyepiece to primary color components of the captured image; and
correcting, as the remaining correction processes, chromatic aberration of the primary color components.

14. An image processing apparatus comprising:
a signal processing unit configured to acquire data of a captured image;
a correction unit configured to correct the captured image to an image suitable for display;
a synthesis unit configured to synthesize an image for synthesis transmitted from an apparatus, which is not provided integrally with the image processing apparatus, with the captured image;
an image display controlling unit configured to control a display panel to display the synthesized image, wherein
the correction unit carries out, from among processes for correcting the captured image to the image suitable for display, part of the correction processes for the captured image before the synthesis by the synthesis unit and carries out remaining correction processes for the image after the synthesis; and
a buffer memory configured to store data of pixels generated by the correction by the correction unit in a generation order of the data, wherein
the image display controlling unit controls such that, every time data of a predetermined number of pixels smaller than a total number of pixels of the captured image are stored into the buffer memory, the data are sent out.

15. A head-mounted display comprising:
an image processing apparatus including
a signal processing unit configured to acquire data of a captured image,
a correction unit configured to correct the captured image to an image suitable for display,
a synthesis unit configured to synthesize an image for synthesis transmitted from an apparatus, which is not provided integrally with the image processing apparatus, with the captured image, and
an image display controlling unit configured to control a display panel to display the synthesized image,
the correction unit carrying out, from among processes for correcting the captured image to the image suitable for display, part of the correction processes for the captured image before the synthesis by the synthesis unit and carrying out remaining correction processes for the image after the synthesis;

an imaging apparatus configured to supply a captured image to the signal processing unit; and the display panel; and a buffer memory configured to store data of pixels generated by the correction by the correction unit in a generation order of the data, wherein the image display controlling unit controls such that, every time data of a predetermined number of pixels smaller than a total number of pixels of the captured image are stored into the buffer memory, the data are sent out.

16. An image displaying method by an image processing apparatus, comprising:

acquiring data of a captured image;

carrying out part of correction processes for correcting the captured image to an image suitable for display;

synthesizing an image for synthesis transmitted from an apparatus, which is not provided integrally with the image processing apparatus, with the captured image for which the part of the correction processes has been carried out;

carrying out, for the image after the synthesis, remaining correction processes from among the correction processes for correcting the captured image to an image suitable for display to generate a display image;

storing data of pixels generated by the correction in a generation order of the data, wherein every time data of a predetermined number of pixels smaller than a total number of pixels of the captured image are stored into the buffer memory, the data are sent out; and causing a display panel to display the display image.

\* \* \* \* \*